United States Patent
Pan et al.

(10) Patent No.: US 7,057,858 B2
(45) Date of Patent: Jun. 6, 2006

(54) SLIDE MICROACTUATOR USING C-SHAPED PIEZOELECTRIC ELEMENT

(75) Inventors: Tzong-Shii Pan, San Jose, CA (US); Satya P. Arya, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 10/131,070

(22) Filed: Apr. 24, 2002

(65) Prior Publication Data
US 2003/0202291 A1 Oct. 30, 2003

(51) Int. Cl.
*G11B 5/56* (2006.01)
(52) U.S. Cl. .................................. 360/294.4
(58) Field of Classification Search ............ 360/294.4, 360/264.1, 266.1
See application file for complete search history.

(56) References Cited

U.S. PATENT DOCUMENTS

| | | | | |
|---|---|---|---|---|
| 5,521,778 | A * | 5/1996 | Boutaghou et al. | 360/264.5 |
| 5,781,381 | A * | 7/1998 | Koganezawa et al. | 360/294.3 |
| 5,882,532 | A | 3/1999 | Field et al. | 216/2 |
| 6,069,771 | A | 5/2000 | Boutaghou et al. | 360/104 |
| 6,118,637 | A | 9/2000 | Wright et al. | 360/294.4 |
| 6,181,531 | B1 | 1/2001 | Koshikawa et al. | 360/294.4 |
| 6,249,402 | B1 * | 6/2001 | Katayama | 360/234.7 |
| 6,587,313 | B1 * | 7/2003 | Kurihara et al. | 360/294.4 |
| 2001/0038515 | A1 * | 11/2001 | Koganezawa et al. | 360/294.4 |
| 2002/0039261 | A1 * | 4/2002 | Sividasan et al. | 360/294.4 |
| 2002/0145819 | A1 * | 10/2002 | Kino et al. | 360/75 |

FOREIGN PATENT DOCUMENTS

| | | |
|---|---|---|
| JP | 10177772 | 6/1998 |
| JP | 11273041 | 10/1999 |
| JP | 2000182341 | 6/2000 |

* cited by examiner

*Primary Examiner*—William Korzuch
*Assistant Examiner*—Mark Blouin
(74) *Attorney, Agent, or Firm*—Ohlandt, Greeley, Ruggiero & Perle, L.L.P.

(57) ABSTRACT

A microactuator device for effecting fine positioning of a transducing head with respect to a selected track on a disk having: a C-shaped piezoelectric element having opposite ends, wherein one end of the piezoelectric element is affixed or connected to one end of the slider, and the other end is affixed or connected to the flexure member for obtaining rotational movement of the piezoelectric element to enable faster and more accurate tracking of the disk by head transducer. Alternately, the C-shaped piezoelectric element has one end affixed or connected to suspension mount plate and other end affixed or actuator arm to obtain larger head movement for further enhanced track following. The C-shaped element could be multiple layered or be shaped like a horizontal or vertical spiral to further increase the element and head movement and tracking accuracy along with faster seek and travel.

6 Claims, 4 Drawing Sheets

SLIDE MICROACTUATOR USING C-SHAPED PIEZOELECTRIC ELEMENT

FIELD OF THE INVENTION

The present invention relates to disk drive systems and, more particularly, to microactuator devices that function to provide fine movements of a head transducer so that densely spaced tracks on a disk may be accurately selected and followed to read and write data.

BACKGROUND OF THE INVENTION

The present invention particularly pertains to a microactuator device for use in a multiple track disk drive system so that fine positioning of a transducing head over a selected track of the disk may be obtained, and more particularly, to a piezoelectric microactuator device that provides a simplified, low-cost construction when compared with the prior art designs.

Magnetic disk drives are information storage devices that use thin film magnetic media to store data. A typical disk drive as seen in FIG. 7 of U.S. Pat. No. 6,166,890, the disclosure of which is incorporated herein, includes one or more rotatable disks having concentric data tracks in which data is read or written. As a disk rotates, a head transducer, also referred to as a magnetic recording head, is supported by a slider and positioned by an actuator element to magnetically read data from, or write data to, various tracks on the disk. Typically, the head transducer is attached to a slider having an air-bearing surface, which is supported adjacent to a data surface comprising the data tracks by a film of air generated by the rotating disk. Suitable wires connect the transducer on the slider to a data processing unit that controls read/write electronic circuitry. The spacing between data tracks continues to decrease with increase in recording density, requiring greater precision for head positioning. External and internal disturbances in a disk drive continuously move the head transducer off the data track. Conventional disk drives correct for off-track motion by actuating the arms carrying the head transducers using a voice coil motor. See the Figures of U.S. Pat. No. 6,115,223, the disclosure of which is incorporated herein by reference. However, a voice coil motor lacks fast response and sufficient resolution for small motions required to effectively maintain position of the transducing head on a track of a high-track density disk. Therefore, a secondary fast response high-resolution head positioning mechanism is necessary for small motions to reduce track registration error in high-density disk drives.

Various prior art piezoelectric microactuator designs correct for hard disk drive disk track misregistration. These include designs with piezoelectric microactuators mounted on the arm, or on the suspension near hinge, or near or under the slider carrying the head transducer. Designs piezoelectric microactuators mounted on the arm produce highest slider movement but excite undesirable voice coil motor coil, arm and suspension load beam modes. Designs with piezoelectric microactuators mounted near the hinge produce medium slider movement but excite undesirable arm tip and suspension modes. Designs with piezoelectric microactuators mounted near the slider produce small slider movement but excite minimum undesirable modes of flexure and load beam. Location of piezoelectric microactuators shall depend on a drive configuration and requirement.

The prior art Japanese patent 63-291271 has a piezoelectric element (formed by cutting a U-shape through groove in a piezoelectric material plate) mounted under and concentric to the slider and appears to provide translation motion along the long axis of the suspension more suitable for linear and not rotary actuators. Present invention differs in configuration of piezoelectric element provides rotary motion and intended for use with rotary actuators.

U.S. Pat. No. 5,856,896 ("'896 patent") teaches the use of two parallel piezoelectric elements on the leading edge of the slider attached to a suspension. It further teaches the use of a compliant shear layer connecting the slider and the suspension. The design of the '896 patent has the disadvantage of using two piezoelectric elements instead of a single element. The design must also deal with fatigue problem related to the compliant layer. Japanese references JA 0097174 and JP 10-027446 also teach the use of two piezoelectric elements polarized in opposite direction and placed under the slider for angular motion. However, normal placement inaccuracies associated with the use of two piezoelectric pieces could result in asymmetrical loading, which in turn could result in undesirable dynamic modes. Also, accurate placement and bonding of two piezoelectric microactuators instead of one is more expensive. Present invention solves these problems by having a simple single element that is polarized in only one direction and placed accurately at slider center.

U.S. Pat. No. 6,166,890 discloses the mounting of the piezoelectric microactuators in the same plane and near the slider. The problem with this approach is that the design has a more complex mechanism like a cradle, is more fragile, excites more undesirable dynamic modes, and is more expensive to manufacture.

SUMMARY OF THE INVENTION

The present invention teaches the placement of the piezoelectric microactuators under or around the slider and near the suspension hinge. This approach is different from the prior art approaches since it provides a pure rotary motion of the suspension or slider for moving transducer head across the tracks with a simple and low cost design configuration. The invention also offers alternate piezoelectric element configurations that have spiral-like shape having large piezoelectric active length that provides the capability of generating large head movement.

In one embodiment, the present invention utilizes a circularly polarized C-shaped piezoelectric element, placed between slider and suspension with one end attached to the slider and the other end attached to the suspension. Alternatively, the C-shaped piezoelectric element of the present invention can be positioned to encompass the3 slider with one end attached to the slider and the other end attached to the suspension. In another alternative, the C-shaped piezoelectric element can be placed in between the suspension mount plate and the arm. In yet another alternative, the C-shaped piezoelectric element can be positioned in a cavity in the arm or mount plate with one end of the element attached to the suspension mount plate and the other end to the arm. In addition to having the element in a "C" configuration, the piezoelectric element can be spiral coil-shaped or helical coil-shaped.

The piezoelectric element of the present invention can have a single or multiple layers of piezoelectric material to increase piezoelectric stroke and off-track correction capability. The top and bottom surfaces of the piezoelectric element are connected to a power source. In case of a C-shaped piezoelectric element, the application of voltage causes a change in the length of the element, thereby resulting in movement of the slider carrying the head transducer across the data tracks on the disk. This movement of head transducer across data tracks by piezoelectric element is utilized by the disk drive servo system to correct for off-track motions of the transducer due to external and internal disturbances for increasing recording density and volumetric storage capacity of a disk drive. A single piece piezoelectric element is easier to handle and locate precisely on a suspension Briefly stated then, a fundamental provision of the present invention is defined as follows:

a disk drive system having an actuator arm to support a slider carrying a transducing head adjacent a selected data track of a rotatable disk having a plurality of concentric data tracks, the slider having an air-bearing surface generally parallel to and confronting the top surface of the rotatable disk, wherein a microactuator device effects fine positioning of the transducing head with respect to the selected data track, the microactuator device comprising the slider carrying a transducer head; a flexure member to which the slider is attached; a load beam to which the flexure member is attached; and a C-shaped piezoelectric element having opposite ends, wherein one end of the piezoelectric element is affixed or connected to one end of the slider, and the other end is affixed or connected to the flexure member for obtaining rotational movement of the slider carrying the head transducer to enable fast and accurate tracking of the data on a high density disk. Alternately, one end of the C-shaped element is attached to the suspension mount plate and other end to actuator arm. In this embodiment, the C-shaped element is placed in between the mount plate and arm or in a cavity of the mount plate or the arm. In another embodiment, a spiral or helical coil-shaped piezoelectric element may be used to cause larger head movement. In yet another embodiment, a multiple layer piezoelectric element may be used to provide larger head movement.

The foregoing and still further objects and advantages of the present invention will be more apparent from the following detailed explanation of the preferred embodiments of the invention in connection with the accompanying drawing.

DESCRIPTION OF THE PREFERRED EMBODIMENTS

In order to appreciate the context of the present invention, i.e., the disk drive system into which the present microactuator device is incorporated, reference may be made to FIG. 8 of the aforementioned U.S. Pat. No. 6,166,890. It will be seen therein that suitable controls enable both gross and fine resolutions of the actuator arm and the transducer head movements respectively with respect to the rotating disks for track selection.

Figure 1:
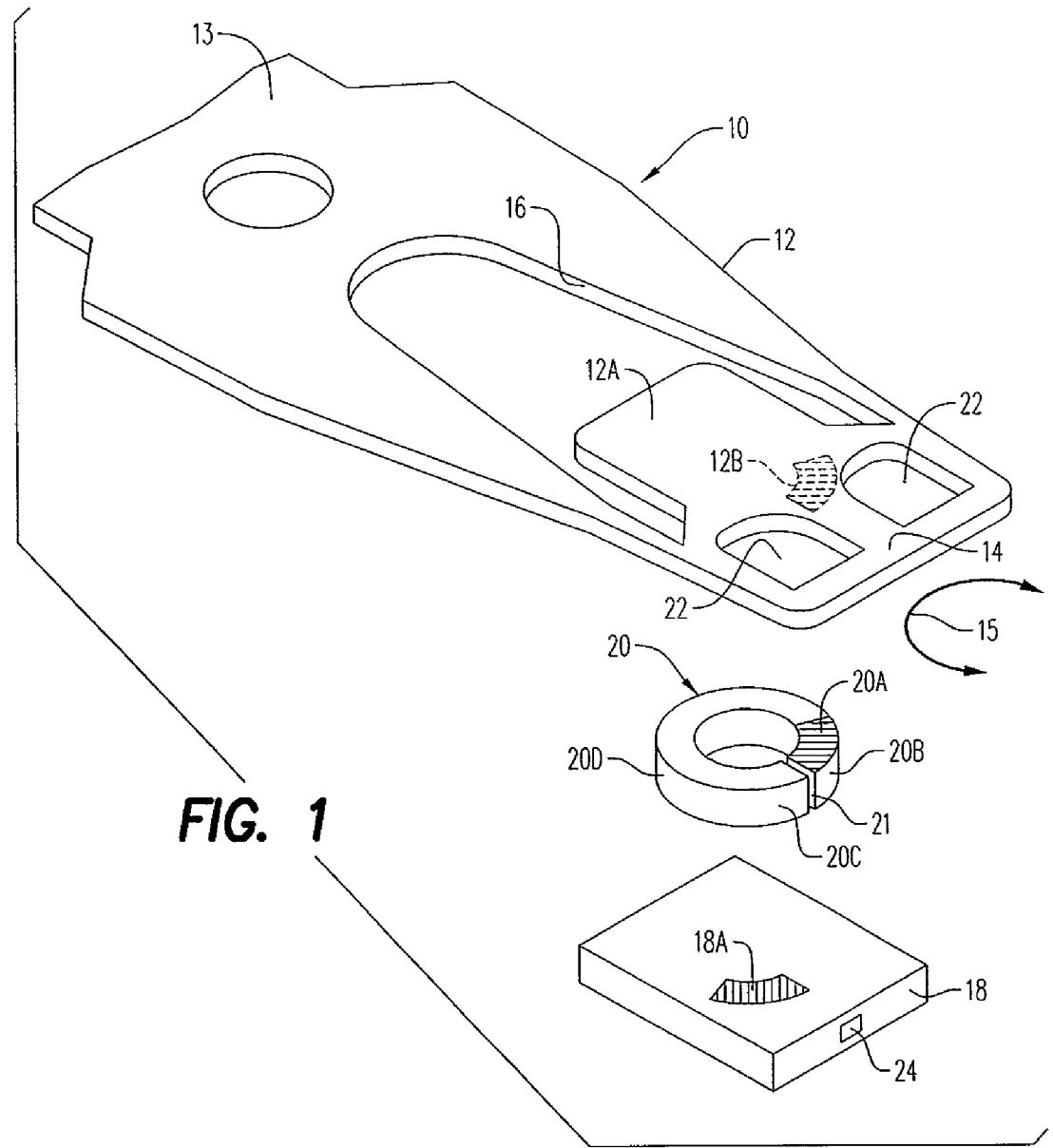
FIG. 1 is an exploded perspective view of one embodiment of the microactuator device of the present invention.
Figure 2:
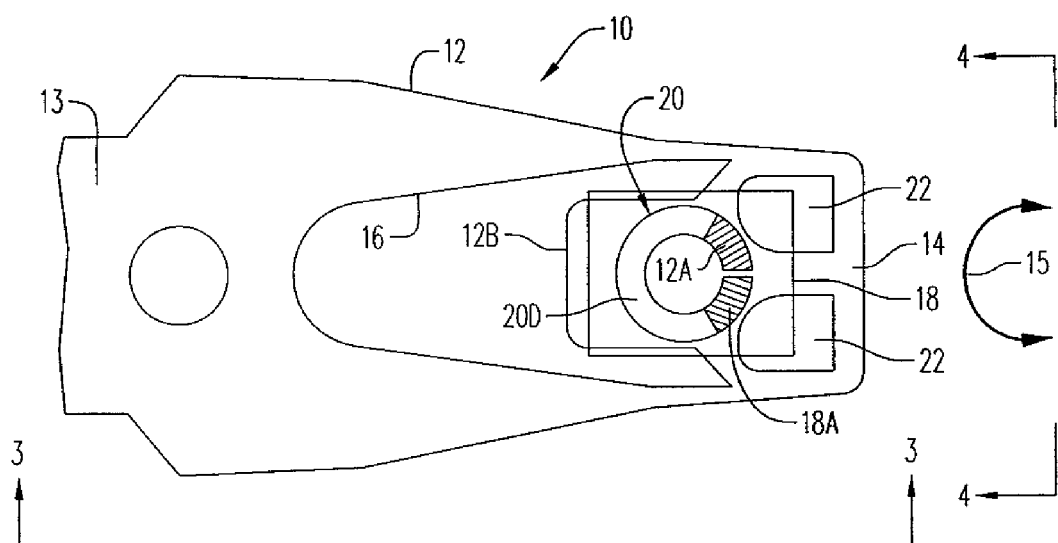
FIG. 2 is a top plan view of the microactuator device of FIG. 1.

The microactuator device 10 shown in FIG. 1 consists of a flexure member 12 which has one end 13 could be welded to a load beam (not seen), piezoelectric actuator element 20 and slider 18 mounted on distal end 14 of the flexure member.

Figure 3:
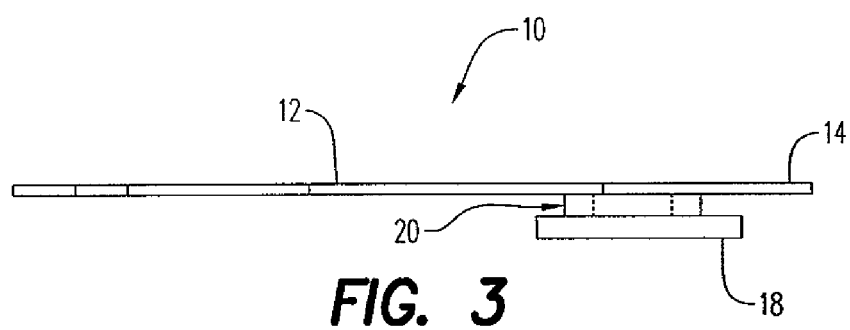
FIG. 3 is a side elevation view of such device.
Figure 4:
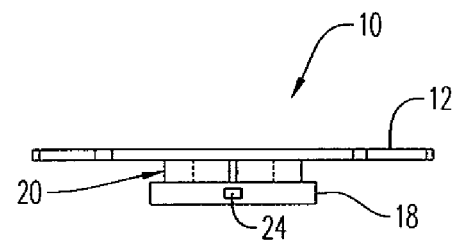
FIG. 4 is an end view of such device.

An opening 16 is formed in the flexure member 12 to define a tongue portion 12A, and to provide enhanced flexibility for the flexure member. The slider 18 is positioned below the flexure member, as best seen in FIGS. 3 and 4. The microactuator element 20 is a piezoelectric crystal in the form of an annulus 20D that is provided with a gap 21 to yield a C-shaped element having two ends, 20B and 20C.

As indicated by the diagonal lines (FIG. 1) an area 18A is used to attach the end 20C of the microactuator element to the upper surface of the slider 18 by the use of a suitable bonding material. Likewise, an area 20A on the other end of microactuator element 20C is used to attach to flexure element area 12B with suitable bonding material. With this arrangement, any extension or contraction of microactuator element 20 will produce a relative rotary motion between the flexure element 13 and slider element 20. In the embodiments were the flexure is fixed, the slider 18 will rotate.

In operation, appropriate external wires (not shown) are used to connect power to the terminal pads 22a and 22b located at top and bottom of the microactuator element. When a positive electric voltage (power) is applied to the two terminals, the microactuator element contracts in circular direction. When a negative voltage is applied it expands. Since flexure 13 is fixed, the slider 18 rotates clockwise with the application of a positive voltage and rotates counter clockwise with the application of a negative voltage. Slider rotation results in off-track direction motion of the head transducer attached to the slider. Based on the magnitude of the off-track position error signal detected by the disk drive electronics, the servo system applies a computed magnitude and direction of voltage to move microactuator in opposite direction to correct for off-track error in real time.

Figures 5A, 5B:
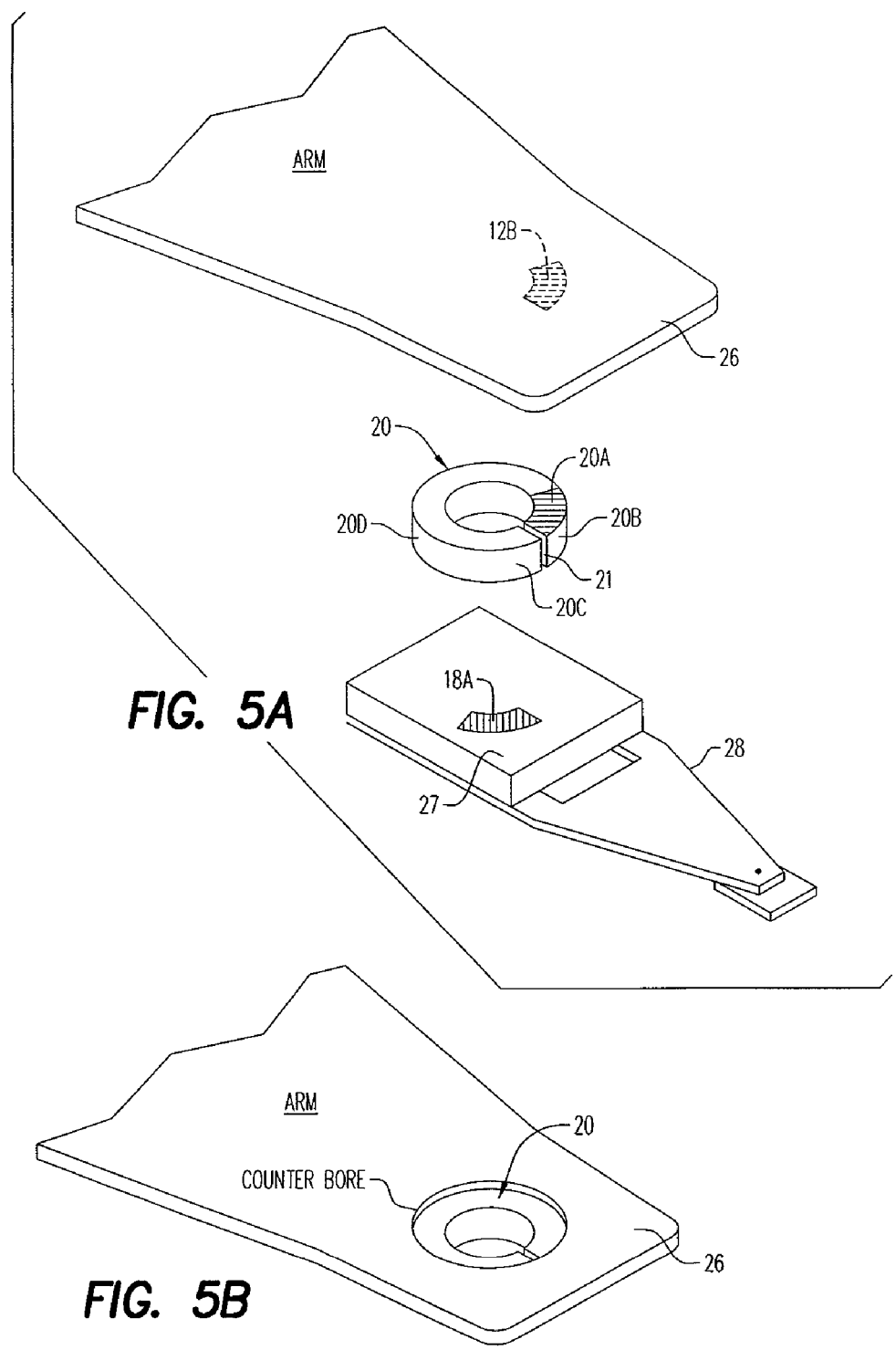
FIG. 5A is an exploded perspective view of second embodiment of the microactuator device with piezoelectric element located at Mount Plate/Arm interface.
FIG. 5B shows a third embodiment with piezoelectric element burned in the mount plate or arm mounted in a cavity in the arm or mount plate.

In an alternate configuration, as seen in FIGS. 5A and 5B, one end of the piezoelectric element 20 is attached to arm 26 at area 12B, and other end is attached to suspension 28 mount plate 27 at area 18A. This configuration provides for a much larger (between 6 to 15 times larger) movement of the slider transducer. The Increased microactuator stroke results in large off-track error correction, shorter track seek and settle time, and ability to read and write more data tracks on the disk, thereby increasing recording density and drive capacity. FIG. 5B shows an arrangement for embedding a piezoelectric element in a hole, with a counterbore, in the arm 26 for attaching such element. This configuration does not add to arm-to-arm spacing in a drive and thus avoids impacts on volumetric recording density.

Figure 6A:
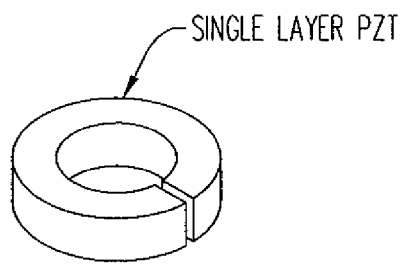
FIGS. 6A, 6B, 6C and 6D are alternate design configurations of the piezoelectric element.
Figure 6B:
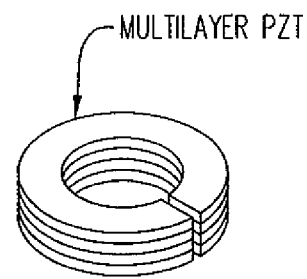
Figure 6C:
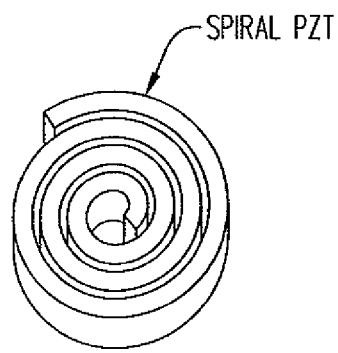
Figure 6D:
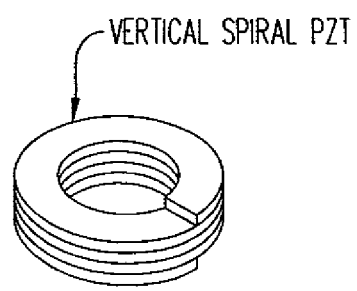

Alternate designs of the piezoelectric elements are shown in FIG. 6A, which include multiple layers of piezoelectric element material (FIG. 6B), horizontal spiral piezoelectric element (FIG. 6C), and vertical spiral piezoelectric element (FIG. 6D). The multiple layer piezoelectric elements cost more but provide higher stroke because of the smaller thickness of each piezoelectric layer. The horizontal spiral configuration in FIG. 6C provides a longer length piezoelectric, thereby generating an increased stroke with the same ratio of length while keeping the height (thickness) the same. The horizontal spiral configuration also provides increased integrity to the piezoelectric structure minimizing piezoelectric deflection in perpendicular direction to the length that steals stroke in rectangular piezoelectric designs. The vertical spiral configuration in FIG. 6D has an increased length, thereby generating an increased stroke similar to the stroke generated by the element of FIG. 6C. All of the above configurations provide a solution to effectively increase head transducer off-track movement by increasing the piezoelectric stroke for same voltage compared to one described in FIG. 1, or decrease piezoelectric operating voltage for the same stroke as the one described in FIG. 1. Different configurations offer solutions to different packaging space restrictions. Further increase in movement of head transducer further increases number of recorded data tracks on the disk and increases recording density and storage on a disk drive.

The invention having been thus described with particular reference to the preferred forms thereof, it will be obvious that various changes and modifications may be made therein without departing from the spirit and scope of the invention as defined in the appended claims.

What is claimed is:

1. A disk drive secondary actuating system comprising a flexure with a fixed portion, a slider carrying a transducing head, and a microactuator device for effecting fine positioning of the transducing head, wherein the microactuator device comprises a circular C-shaped piezoelectric element having opposite ends, wherein one end of the piezoelectric element is affixed or connected to one end of the slider, wherein the other end of the piezoelectric element is affixed or connected to the flexure for obtaining movement of the transducing head to enable fine tracking of the disk, wherein the C-shaped piezoelectric element comprises multiple layers of piezoelectric material stacked along an axial direction, and wherein said axial direction is perpendicular to a plane of movement of said slider.

2. The disk drive system of claim 1, wherein the C-shaped piezoelectric element is alternatively shaped like a spiral for large head movement for increased off track correction and higher recording density, wherein a first end selected from the one end and the other end is located in a center of the piezoelectric element, and wherein a second end selected from the one end and the other end is located in a periphery of the piezoelectric element.

3. The disk drive system of claim 1, wherein the C-shaped piezoelectric element comprises opposite ends, wherein one end of the piezoelectric element is affixed or connected to a mount plate attached to a load beam, and wherein the other end of the piezoelectric element is affixed or connected to an arm member for obtaining rotational movement of the head transducer to enable tracking on the disk.

4. The disk drive system of claim 3, wherein the C-shaped piezoelectric element is alternatively disposed within the mount plate.

5. A microactuator device comprising:

a slider carrying a head transducer;

a flexure member attached to a load beam; and a C-shaped piezoelectric element having opposite ends, wherein one end of the piezoelectric element is affixed or connected to one end of the slider, wherein another end of the piezoelectric element is affixed or connected to the flexure member for obtaining off track movement of the head transducer to enable tracking of a disk, wherein the C-shaped piezoelectric element has multiple layers of piezoelectric material stacked along an axial direction, and wherein said axial direction is perpendicular to a plane of movement of said slider.

6. The microactuator device of claim 5, wherein the C-shaped piezoelectric element is alternatively shaped like a spiral for large head movement for increased off track correction and higher recording density, wherein a first end selected from the one end and the other end is located in a center of the piezoelectric element, and wherein a second end selected from the one end and the other end is located in a periphery of the piezoelectric element.

* * * * *